May 20, 1924.
E. A. SEWARD ET AL
NUT LOCK
Filed March 17, 1923
1,494,817
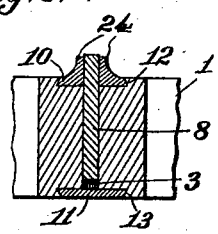
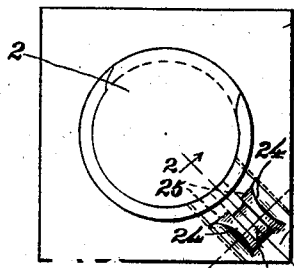
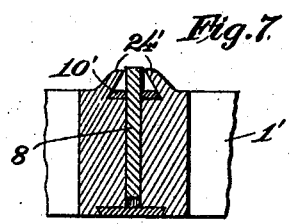
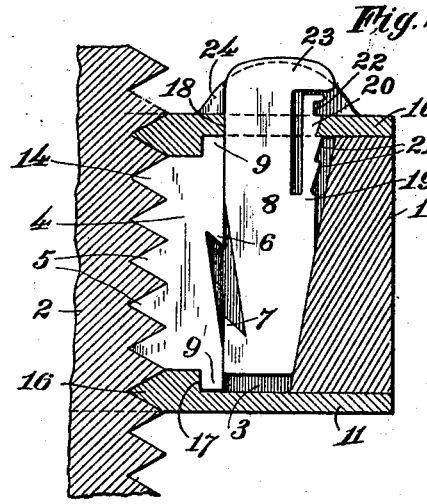
Inventors
Edward A. Seward
and Victor Seward
By Edgar M Kitchin
Their Attorney.

Patented May 20, 1924.

1,494,817

UNITED STATES PATENT OFFICE.

EDWARD A. SEWARD AND VICTOR SEWARD, OF COLUMBUS, GEORGIA.

NUT LOCK.

Application filed March 17, 1923. Serial No. 625,803.

*To all whom it may concern:*

Be it known that we, EDWARD A. SEWARD, a subject of the King of England, and VICTOR SEWARD, a citizen of the United States, residing at Columbus, in the county of Muscogee and State of Georgia, have invented certain new and useful Improvements in Nut Locks; and we do hereby declare the following to be a full, clear, and exact description of the invention, such as will enable others skilled in the art to which it appertains to make and use the same.

This invention relates to improvements in nut locks in which movable parts are tightened after assemblage.

The object in view is the provision of simple and inexpensive, and yet efficient, means for preventing the backing off or loosening of a nut after it has been once tightened up or threaded home.

With this and further objects in view as will in part hereinafter become apparent and in part be stated, the invention comprises certain novel constructions, combinations and arrangements of parts as subsequently specified and claimed.

In the accompanying drawings,—

Figure 1 is a plan view of a nut mounted on a bolt and provided with an embodiment of the present invention.

Figure 2 is a vertical section therethrough taken on the plane indicated by line 2—2 of Figure 1, the parts being seen on a greatly enlarged scale.

Figure 3 is a similar section on the same scale with the parts shown in the position just prior to the tightening of the wedge.

Figure 4 is a perspective view of the upper locking slide detached.

Figure 5 is a similar view of the lower locking slide.

Figure 6 is a vertical section on the same scale as Figure 1 taken on the plane indicated by line 6—6 of Figure 1.

Figure 7 is a similar view of a slightly modified embodiment.

Figure 8 is a view similar to Figure 4 of the upper locking slide of the structure as seen in Figure 7.

Figure 9 is a fragmentary, plan view of that corner portion of the nut body provided with the locking apparatus, the locking apparatus being omitted and the parts being shown on an enlarged scale.

Referring to the drawings by numerals, 1 indicates a nut threaded onto the bolt 2. The nut 1, preferably in the area adjacent one of the angles of the nut, is formed with a vertical slot, recess or groove 3 opening into the bore of the nut. This groove 3 may be located at any desired place about the nut but an angle of the nut affords more area of material and thus enables the provision of the groove without injuriously weakening the nut in its entirety. Since the groove 3 opens into the bore of the nut, a segment or threaded section of the nut is thereby bodily removed, and such section is replaced by a gripping plate 4 of a length slightly less than the length of the groove 3, of a width to snugly fit between the side walls of the groove and provided at its inner edge with thread sections 5, 5 corresponding to and designed to be arranged continuous of the threads of the nut. The wedging or gripping plate 4, however, is not of the same depth as the groove 3, and its outer edge, while susceptible of being made smooth, is preferably provided with a notch 6 adapted to co-operate with a projection 7 on a wedge 8, which is arranged to extend within the groove 3 between the outer edge of wedging plate 4 and the base of the groove 3. The wedging plate 4 is of a length less than the thickness of the nut 1, and has its end portions terminating in longitudinally-extending lugs 9 adapted to interlock or lap the shoulders of the respective locking slides. A locking slide 10 is arranged at the upper end of wedging plate 4 and a locking slide 11 is arranged at the lower end thereof, each of said locking slides being provided with beveled edges so as to dovetail in the respective dovetail grooves 12 and 13 at the respective upper and lower faces of the nut, the said dovetail grooves extending from the bore of the nut outward to the outer border of the nut. Slide 10 is provided at its inner edge with a thread section 14, and spaced outwardly from the thread section the slide 10 is provided with a downwardly-extending offset shoulder 15 arranged to interlock with the respective lug 9 of plate 4. The thread section 14 is proportioned and adapted to be located to be continuous of the thread of the nut 1, but to avoid nicety of fitting may preferably be slightly reduced so as to insure the action of the thread sections 5 of wedging plate 4 in wedging against the bolt 2 without interference by the thread section 14. The slide 11 is provided with a thread section 16 similar in construction, arrangement and function to thread section 14, and the slide 11 is also provided with an upstanding shoulder 17 adapted to co-operate with the lower lug 9.

The locking slide 10 is formed with an aperture 18 for accommodating and permitting movement of the wedge 8, and the said wedge is of a thickness to snugly fit between the side walls of the groove 3. Wedge 8 is also provided with an outer edge, beveled or tapered downwardly, adapted to contact with the base of the groove 3, which base is inclined so as to co-operate in moving the wedge inwardly as it is forced downwardly. The inner edge of the wedge 8 is adapted to contact with the inner edge of wedging plate 4 to force said plate radially inward when the wedge 8 is driven downward, there being in the embodiment shown a space in the length of the wedging plate 4 and the wedge 8 where these two parts are out of contact for enabling the provision of the projection 7 and the notch 6, but where such projection and notch are not employed the edge contact of wedge 8 with wedging plate 4 would be substantially continuous after the manner of the contact of the outer edge of wedging plate 8 with the base of groove 3, as seen in Figure 2. The wedge 8 is provided with a shoulder 19 designed to underhang the locking slide 10, and a spring ratchet 20 upstands from the shouldered portion of wedge 8 in position for engaging the adjacent edge of plate 10 formed by the aperture 18 through which the upper portion of the wedge 8 extends. The tension of the spring ratchet 20 is such as to normally press the wedge 8 inward, and the ratchet is spaced from the main body of the wedge 8 sufficiently to allow the several notches 21 of the ratchet to click past the plate 10 when the wedge 8 is moved downwardly from the position seen in Figure 3 to the position seen in Figure 2, so that the ratchet 20 may spring back to assume the final position with one of its notches 21 underhanging the slide 10.

In operation, it will be understood that the nut 1 is provided with the parts assembled as indicated in Figure 3, and when so assembled the wedging plate 4 and wedge 8 may not escape because of the presence of the slides 10 and 11, and the co-operation therewith of the lugs 9, notch 6 and projection 7, and the shoulder 19. The movable parts may be removed from the nut only before the nut has been applied to the bolt and only by sliding the locking slides 10 and 11 inward until freed from their respective grooves 12 and 13. The parts being assembled in the nut as seen in Figure 3, the nut is applied to the bolt and threaded thereon in the usual manner of tightening a nut. After the nut has reached its seated position, it is only necessary to drive the wedge 8 downward until it is tight, as indicated in Figure 2, to effectively lock the nut against possible backing off or loosening. As the wedge 8 is driven downward it acts edgewise against the wedging plate 4 and forces the same into such frictional contact with the bolt 2 as to effectively resist any action tending to loosen the nut. The parts being in the position seen in Figure 2, if it is desired to remove the nut, it is only necessary to apply an instrument, such as a screw-driver or the like, against the upper end of the spring ratchet 20, preferably in a notch 22 provided for the reception of such a tool, and then to press the upper end of the ratchet inward sufficient for springing the same out of line with the engaged edge of slide 10. The operator then pries upwardly on the engaged part and thus lifts the wedge 8 while the spring ratchet 20 is out of line with the normally engaged edge of slide 10. As soon as the wedge 8 has been thus lifted and, therefore, restored to the position seen in Figure 3, the nut may be unscrewed from its bolt.

The wedge 8 is preferably provided with a head 23 which overhangs the spring ratchet 20 for purposes of protection of the parts, and the slide 10 is preferably provided with a pair of upstanding spaced lips 24, 24, arranged to shield the upper end and head of the wedge 8 when the wedge is in its final position as seen in Figure 2.

Directions have been referred to as up and down, in and out, with the understanding that the parts are in the position indicated in Figures 1, 2 and 3 of the drawings, it being understood that the actual directions would vary with various locations of the parts but the relative movements would remain the same. It will also be observed that each of the slides 10 and 11 is preferably tapered at its outer end to conform to the angle of the nut and to complete the respective corner thereof, but this particular formation of the slide may be varied as may become desirable.

In Figures 7 and 8, there is shown a slight modification from the structure just described, the changes consisting essentially in providing locking slides such as slide 10' with its inner edge formed smooth, as indicated at 16', and short enough to miss the threads of the bolt altogether. The particular locking slide 10' is also formed without the protecting lips for the upper end of the wedge, since those lips are formed integral with the nut 1', the said lips being indicated at 24', 24'. The other parts shown in Figure 7, being identical with those just described, require no further description.

The locking nut thus described is, of course, adapted for general application and use, such as for railways, machinery, automobiles, and the like, and we find the invention especially well adapted for use in conjunction with the retention of the terminal clamps of secondary batteries, such as are commonly employed for the lighting and ignition systems of automobiles.

As clearly seen in Figure 6, the recess or groove 3 is relatively narrow to snugly accommodate the wedging or gripping plate 4 and the wedge 8, and said groove 3 terminates in the grooves 12 and 13 which are arranged horizontally and extend from the bore of the nut to the outer margin thereof. That part of each groove 12, 13, adjacent the bore is formed with a segmental enlargement 25 to accommodate the respective shoulder 15, 17.

What is claimed is:—

1. In nut lock construction, the combination of a nut body having a recess opening into its bore, a gripping or friction plate movably mounted in said recess and adapted to have its inner portion engage a bolt onto which the nut body is threaded, a wedge adapted to be forced between and engage the outer portion of the gripping plate and an opposed portion of the wall of the nut body for wedging the gripping plate into gripping relation with the bolt engaged by the nut body, and a detent for locking the wedge against withdrawal.

2. In nut lock construction, the combination of a nut body having a recess opening into its bore, a gripping plate within the recess, means for forcing the gripping plate into frictional engagement with a bolt engaged by the nut body, and locking slides engaging the opposite faces of the nut body and the end portions of the gripping plate for retaining the latter in position.

3. In nut lock construction, the combination of a nut body having a recess opening into its bore, a gripping plate arranged in the recess, locking slides engaging the opposite faces of the nut body and the terminals of said gripping plate for retaining the latter against displacement from the recess, and a wedge extending through one of the slides and engaging the gripping plate for forcing the same inward.

4. In nut lock construction, the combination of a nut body having a recess opening into its bore, a friction plate in said recess, a wedge between the friction plate and a part of the wall of the nut body for forcing the friction plate inward toward a bolt engaged by the nut body, a spring ratchet extending from the wedge, and means detachably engaging the ratchet for retaining the wedge in a given position.

5. In nut lock construction, the combination of a nut body having a recess opening into its bore, a friction plate in said recess, a wedge between the friction plate and a part of the wall of the nut body for forcing the friction plate inward toward a bolt engaged by the nut body, a spring ratchet extending from the wedge, and means detachably engaging the ratchet for retaining the wedge in a given position, the spring ratchet being formed with means for receiving an instrument for springing the ratchet out of retaining engagement for enabling withdrawal of the wedge.

6. In nut lock construction, the combination of a nut body having a recess opening into its bore, a friction plate in said recess, a wedge between the friction plate and a part of the wall of the nut body for forcing the friction plate inward toward a bolt engaged by the nut body, a spring ratchet extending from the wedge, means detachably engaging the ratchet for retaining the wedge in a given position, and a head on the wedge overhanging the ratchet.

7. In nut lock construction, the combination of a nut body having a recess opening into its bore, a friction plate in said recess, a wedge between the friction plate and a part of the wall of the nut body for forcing the friction plate inward toward a bolt engaged by the nut body, a spring ratchet extending from the wedge, means detachably engaging the ratchet for retaining the wedge in a given position, and shields upstanding at the sides of the wedge for protecting the same.

8. In nut lock construction, the combination of a nut body having a recess opening into its bore, a gripping plate movably mounted in the recess, a wedge for driving the gripping plate into gripping position, a locking slide for retaining the gripping plate from dislocation, the wedge extending through the slide, and a spring ratchet extending from the wedge and engaging the slide for locking the wedge in its wedging position.

9. In nut lock construction, the combination of a nut body having a recess opening into its bore, a gripping plate movably mounted in the recess, a wedge for driving the gripping plate into gripping position, a locking slide for retaining the gripping plate from dislocation, the wedge extending through the slide, and upstanding shields from the slide at the opposite sides of the projecting portion of the wedge.

10. In nut lock construction, the combination of a nut body having a recess opening into its bore, a gripping plate in the recess, a wedge for driving the gripping plate into gripping relation with a bolt engaged by the nut body, and means preventing dislocation of the wedge, the wedge and gripping plate being formed with interacting recesses and projections.

In testimony whereof we affix our signatures in presence of two witnesses.

EDWD. A. SEWARD.
VICTOR SEWARD.

Witnesses:
    EVA BETZ,
    R. K. MUNN.